(No Model.)

W. J. NEELY.
SUBSOILER ATTACHMENT FOR PLOWS.

No. 537,302. Patented Apr. 9, 1895.

Witnesses:
B. S. Ober.

Inventor:
William J. Neely.
by Henry Ott, Atty.

UNITED STATES PATENT OFFICE.

WILLIAM J. NEELY, OF CLAY HILL, SOUTH CAROLINA.

SUBSOILER ATTACHMENT FOR PLOWS.

SPECIFICATION forming part of Letters Patent No. 537,802, dated April 9, 1895.

Application filed October 16, 1894. Serial No. 526,024. (No model.)

*To all whom it may concern:*

Be it known that I, WILLIAM J. NEELY, a citizen of the United States, residing at Clay Hill, in the county of York and State of South Carolina, have invented certain new and useful Improvements in Subsoiler Attachments for Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to plows, and more particularly to sub-soiler attachments for plows, and it has for its object the provision of means whereby a sub-soil plow is adapted for use on plows the beams of which differ in width and thickness.

It has for its further object the combination with the sub-soil plow, of a reversible plow point, and in so constructing the standard for said sub-soil plow as to perform the function of a colter to more effectually break up the soil plowed up by the sub-soiler, and thereby materially lighten the draft, as will now be fully described, reference being had to the accompanying drawings, in which—

Figure 1:
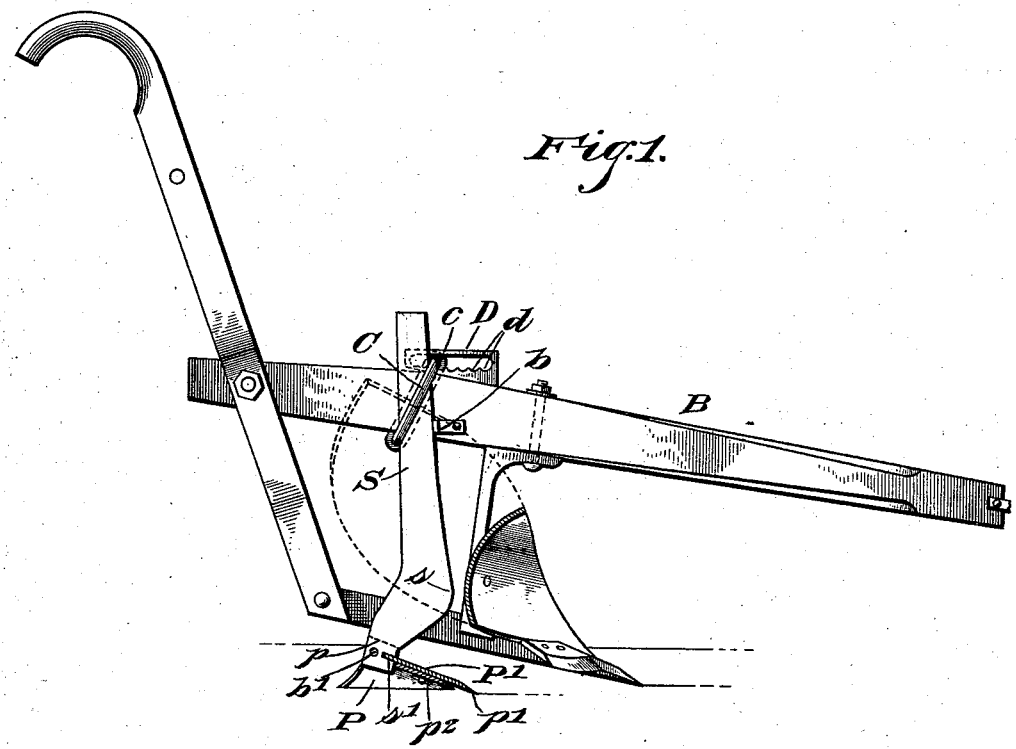
Figure 2:
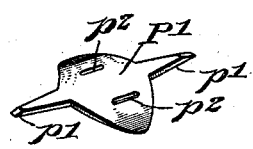
Figure 3:
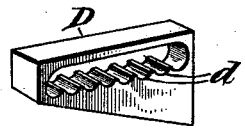

Figure 1 is a sectional side elevation of a plow embodying my invention, the mold board being partly broken away. Fig. 2 is a perspective view of the sub-soil plow point; and Fig. 3 is a like view of the adjusting block.

The plow illustrated in Fig. 1 may be of any well known or preferred construction, the beam B having an abutment $b$ on the mold board side that serves as a bearing for the front edge of the standard S of the sub-soil plow P, said standard having its lower portion near the foot considerably widened and curved rearwardly, the front edge of said curved portion or breast $s$ being sharpened so as to cut the soil turned up by the sub-soiler.

As shown in Figs. 1 and 2, the cutting breast or edge $s$ of the standard S lies a comparatively short distance above the plow and substantially on a line with the point of the plow P proper, so that as the soil is lifted by the plow point P' it will be immediately cut up by the cutting breast or edge $s$, thereby materially lightening the draft. Near its foot the standard S has a notch $s'$ that serves as a bearing for the sub-soil plow P, which is provided with flanges $p$ secured to the standard by means of bolts $b'$. The notch $s'$ is of sufficient height and depth to accommodate also one of the points $p'$ of the reversible plow point P', which is of substantially a diamond shape, the apices of diametrically opposite angles being prolonged into cutter points $p'$, as shown, and suitable holes $p^2$ are provided for the passage of the bolts that secure the point P' to the sub-soiler, so that its said point can be readily removed and reversed.

For the purpose of properly supporting the point P' when reversed, I elongate the bolt holes $p^2$ so that the point P' may be set back sufficiently to bring the worn cutter point into the aforesaid notch $s'$.

The sub-soiler standard S is secured to the plow beam B by means of a clamp or clip C of well known construction, and in order to adapt the standard for use on plows the beams of which are of different width and thickness, I construct the clip so as to fit a plow beam having a maximum width and thickness and employ a wedge shaped adjusting block D for plows having a beam of less thickness, or of less width and thickness, said block having transverse bearings $d$ for the upper leg $c$ of the U-shaped portion of the clip C. In practice I prefer to construct the block D in the form of a link, so as to adapt the same to be permanently connected with the clip C, and thus avoid its being misplaced or lost.

Having thus described my invention, what I claim as new therein, and desire to secure by Letters Patent, is—

1. The combination of a subsoil plow with a standard S having near the foot thereof a cutting breast $s$, projecting forwardly and overhanging said subsoil plow, so as to form a re-entering angle between the two for the purpose set forth.

2. The standard S provided near its foot with a forwardly projecting cutting breast $s$, and with a notch $s'$ in its front edge below said breast, and a subsoil plow bolted to the foot of the standard, in combination with a reversible blade P' adjustably secured to the subsoil plow, said blade provided with two points $p'$ $p'$ and a laterally enlarged body as shown and described, one of the points adapted to fit into the notch $s'$, for the purpose set forth.

3. The combination with the beam of a plow provided on the mold board side with an abutment, as $b$, the sub-soiler standard S, and the clip C, of the wedge-shaped block D, substantially as and for the purpose set forth.

In testimony that I claim the foregoing as my invention I have hereto signed my name in the presence of two witnesses.

WILLIAM J. NEELY.

Witnesses:
W. L. PLEXICO,
J. A. STEWART.